United States Patent [19]

Tanke, II

[11] Patent Number: 4,580,396
[45] Date of Patent: Apr. 8, 1986

[54] ASPARAGUS HARVESTER

[76] Inventor: Eugene T. Tanke, II, 5233 S. Greenwood, Apt. 3, Chicago, Ill. 60615

[21] Appl. No.: 593,909

[22] Filed: Mar. 27, 1984

[51] Int. Cl.[4] ........................................... A01D 45/00
[52] U.S. Cl. ..................................... 56/327 A; 56/10.2
[58] Field of Search .......... 56/327 A, 10.2, DIG. 15, 56/14.3, 119, 327 R, 328 R

[56] References Cited

U.S. PATENT DOCUMENTS

| 887,466 | 5/1908 | Davis | 56/327 A |
|---|---|---|---|
| 2,581,119 | 1/1952 | Matteoli | 56/327 A |
| 3,636,687 | 1/1972 | McKissick et al. | 56/327 A |
| 4,003,193 | 1/1977 | Haws | 56/327 A |
| 4,064,682 | 12/1977 | Haws | 56/327 A |
| 4,185,696 | 1/1980 | Williams et al. | 56/119 |
| 4,425,751 | 1/1984 | Bousseau et al. | 56/327 A |
| 4,512,145 | 4/1985 | Lund | 56/327 A |

FOREIGN PATENT DOCUMENTS 53994 6/1982 European Pat. Off. .......... 56/327 A

Primary Examiner—Gene Mancene
Assistant Examiner—John G. Weiss
Attorney, Agent, or Firm—John J. Swartz

[57] ABSTRACT

An asparagus harvester for selectively harvesting asparagus spears of a predetermined height including a mobile frame, severing mechanism mounted on the frame for movement between a raised position and a lowered position, apparatus mounting the severing mechanism on the frame for vertical movement while permitting horizontal movement thereof in any direction as the severing mechanism is being moved vertically, and guide mechanism for guiding the severing mechanism as the severing mechanism is downwardly moved and to follow the contour of the asparagus spear to position the severing mechanism adjacent the base of the spear.

47 Claims, 7 Drawing Figures

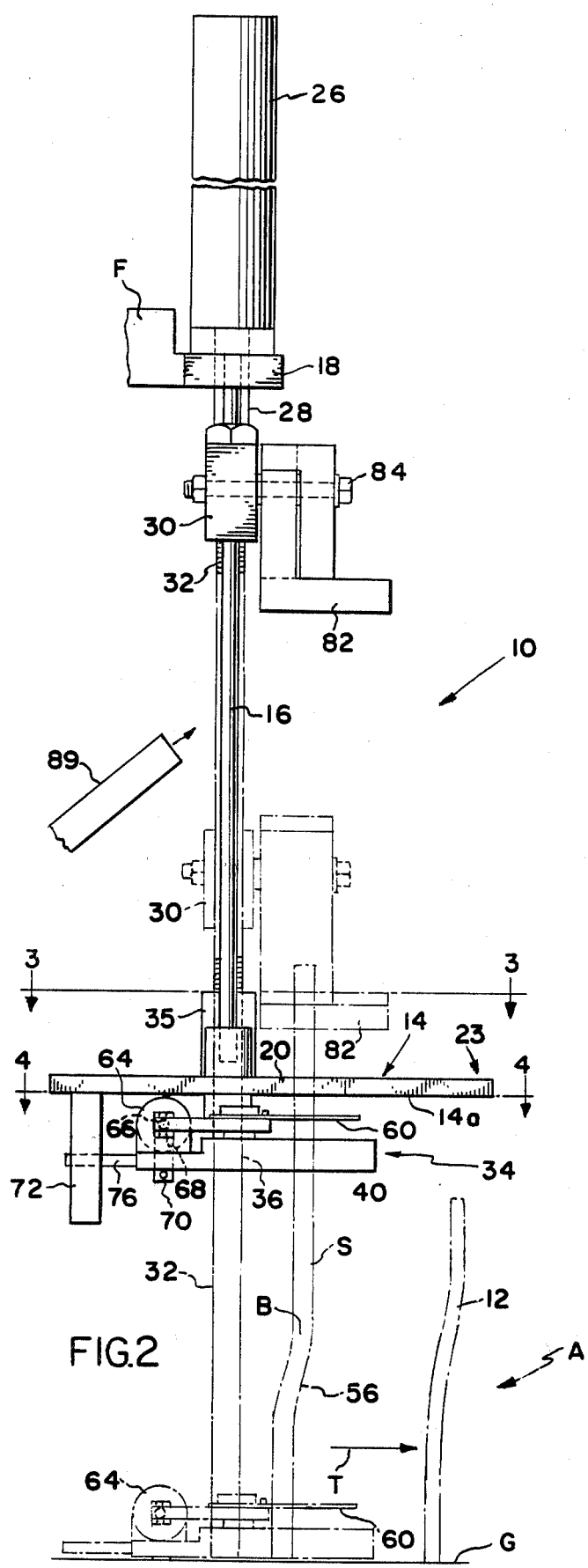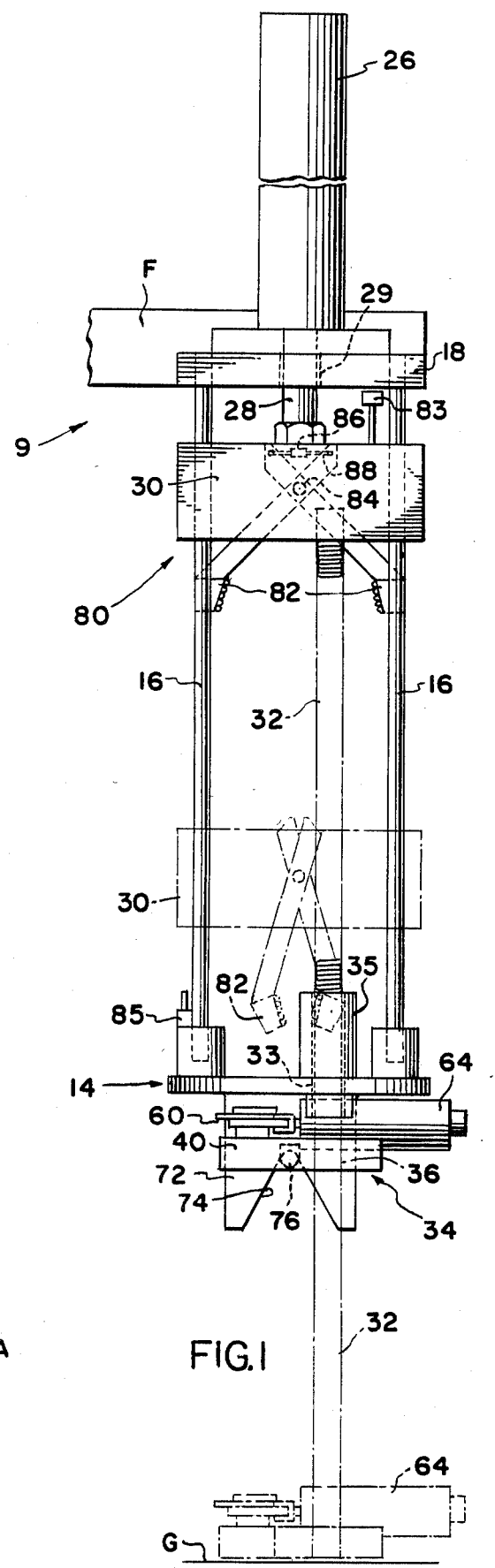

ASPARAGUS HARVESTER

BACKGROUND OF THE INVENTION

1. Field of the Invention

This invention is related to a vegetable harvester an more particularly to apparatus for harvesting asparagus. Still more particularly, this invention relates to apparatus which will sense the presence of a mature asparagus spear and includes asparagus severing mechanism which is guided downwardly along the length of the spear to the base of the spear in which position the severing mechanism is activated to sever the spear.

2. Description of Prior Art and Objects

Traditionally, asparagus is grown as individual spear in a bed of spears. The asparagus spears do not all mature at the same time and it is generally desirable to select for harvesting only those spears which are of a proper height and breath. Traditionally, asparagus harvesting has been accomplished with manual labor. With the increasing labor costs, and the short season manual labor is expensive and not always readily available.

Various attempts have been made heretofore to provide a mechanical asparagus harvester such as that disclosed in U.S. Pat. No. 887,466 issued to David on May 12, 1908; U.S. Pat. No. 2,581,119 issued to Matteoli on Jan. 1, 1952; U.S. Pat. No. 2,690,043 issued to Marihart on Sept. 28, 1954; U.S. Pat. No. 3,447,292 issued to Rehmke on June 3, 1969; U.S. Pat. No. 3,609,949 issued to Neal on Oct. 5, 1971; and U.S. Pat. No. 4,007,579 issued to Wadekamper on Feb. 15, 1977.

Asparagus spears do not mature in a controlled cycle but rather randomly mature. It is desirable that the mature spears be harvested while leaving undamaged the immature spears. Accordingly, it is an object of the present invention to provide an asparagus harvester which will harvest mature spears with minimal disturbance to adjacent immature spears.

The apparatus harvestor constructed according to the present invention contemplates an asparagus spear height sensing, divider head which is mounted on a mobile frame a distance above the ground equal substantially to the predetermined height of mature asparagus spears. The head includes spaced apart, rearwardly converging divider legs which laterally inwardly direct the upper portions of the mature asparagus spears as the harvestor is forwardly propelled.

Mounted below and trailing the head is a guide foot having spaced apart guide legs which receive the mature spears therebetween. Severing mechanism is mounted on the foot which is mounted on a generally vertical, horizontally yieldable, vertically movable spring. As the foot is moved downwardly, the guide legs guide along the outer surface of the mature asparagus spear, even though the spear is curved or skewed. The mounting spring is selected of such material that its stiffness is less than the stiffness of an asparagus spear so that the spring, rather that the spear, will horizontally yield as the guide foot guides along the contour of the asparagus stalk spear to a position adjacent the base of the spear. Accordingly, it is an object of the present invention to provide an asparagus harvester which will guide a severing mechanism from a raised position along the contour of the asparagus spear to the base of the spear.

It is another object of the present invention to provide an asparagus harvester of the type described including a guide for guiding a severing mechanism in a path following the contour of an asparagus spear to a position adjacent the base of the spear.

Yet another object of the present invention is to provide an asparagus harvester of the type described including apparatus mounting severing mechanism for universal movement in any horizontal direction as it is being moved vertically and guide mechanism for guiding the severing mechanism along the contour of the stalk to a position adjacent the base of the stalk.

Still another object of the present invention is to provide an asparagus harvester including severing mechanism mounted on a guide foot which guides along the outer stalk surface as it is moved vertically and is mounted on a horizontally yieldable member which allows the severing mechanism to horizontally move as it is being vertically moved.

A further object of the present invention is to provide an asparagus harvester for selectively harvesting asparagus spears of a predetermined height and a predetermined breath.

A still further object of the present invention is to provide an asparagus harvester including a height sensing head including laterally spaced apart, forwardly projecting divider legs and a guide foot, vertically movably mounted on the height sensing head and having laterally spaced apart, forwardly projecting guide legs for guiding along a mature asparagus spear, and spear severing mechanism mounted on the guide foot.

Another object of the present invention is to provide an asparagus harvester of the type described having horizontally yieldable, spear severing mechanism which will horizontally yield in any direction as it vertically moves and follows the contour of a mature asparagus spear so as not to break the asparagus spear as it guides therealong.

Other objects and advantages of the present invention will become apparent to those of ordinary skill in the art as the description thereof proceeds.

SUMMARY OF THE INVENTION

An asparagus harvester including a mobile frame, movable in a forward path of travel, severing mechanism on the frame for severing at least one mature spear in a bed of asparagus spears; apparatus for vertically moving the severing mechanism between a raised inoperative position and a lowered position adjacent the base of the spear including mechanism permitting the severing mechanism to horizontally move in any horizontal direction as the severing mechanism moves downwardly; and mechanism for horizontally guiding the severing mechanism in a path following the contour of the spear as the severing mechanism moves between the raised and lowered positions.

BRIEF DESCRIPTION OF THE DRAWINGS

The invention may be more readily understood by referring to the accompanying drawings, in which:

FIG. 1 is a front elevational view of an asparagus harvester constructed according to the present invention;

FIG. 2 is a side elevational view thereof;

DESCRIPTION OF PREFERRED EMBODIMENT

Figure 3:
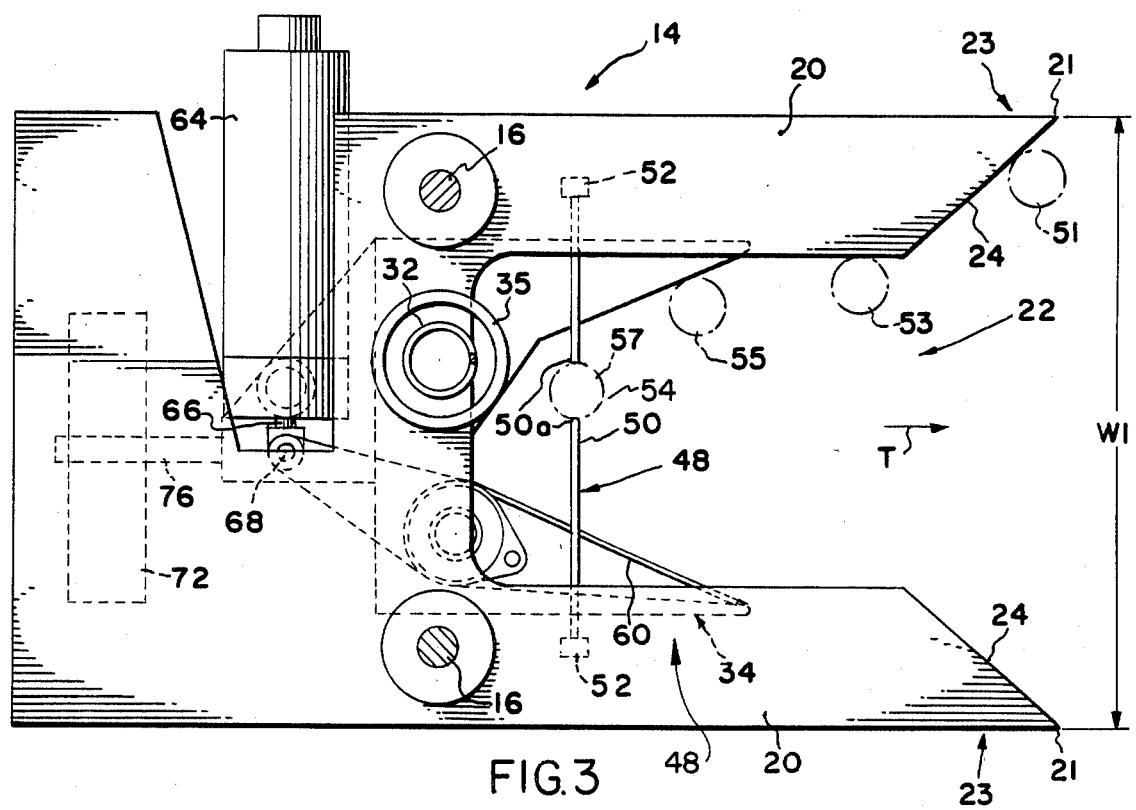
FIG. 3 is an enlarged sectional plan view of the height sensing, divider head, taken along the line 3—3 of FIG. 2.

An asparagus harvestor, constructed according to the present invention, generally designated 9, is provided for harvesting a mature, growing asparagus spear or stalk, generally designated S, of predetermined height, without disturbing an immature asparagus stalk, generally designated 12, having a height less than the predetermined height. The harvesting apparatus 9 includes a plurality of harvesting units 10 mounted on a mobile frame, schematically designated F, which is mounted on a hydraulic lift system (lift system) conventially provided on a mobile vehicle (not shown) such as a tractor having spaced apart wheels that span the asparagus bed A. The asparagus bed A will typically include randomly spaced spears S which have grown to at least a predetermined height and immature spears 12 which have not yet grown to the predetermined height. Of the mature height spears S, some will have a breadth B which is at least a predetermined mature breadth and some will have a breadth B which is less than a mature breadth.

Although it should be understood that a plurality of the asparagus harvesting units 10 may be mounted on the frame F, only one such unit 10 is illustrated will be described in detail. The harvesting units 10 would typically be laterally spaced and longitudinally staggered along the length of the frame F which is mounted transverse to the length of the asparagus bed A and transverse to the forward direction of travel, represented by the arrow T.

Each harvesting unit 10 includes a height sensing divider head, generally designated 14, mounted on the frame F via a pair of upstanding guide rods 16 which are fixed, at their upper ends, to a mounting block 18, fixed to the frame F. The height sensing divider head 14 comprises a generally U shaped plate having a pair of forwardly projecting, height sensing, spear divider legs 20 which are spaced apart to provide a forwardly opening, stalk receiving channel 22. The width of the channel 22 might typically be four inches.

The frame F will typically be vertically adjustable via hydraulically or pneumatically controlled lift mechanism (not shown) conventionally provided on farm tractors to vertically adjust the level of the divider head 14 such that the underside 14a of the divider head is spaced from the ground G a distance substantially equal to the predetermined height of the asparagus spears to be harvested. This distance may typically be six to seven inches. The forward ends 23 of the height sensing divider legs 20 include opposed, laterally inward rearwardly converging guide surfaces 24 which laterally inwardly direct the upper portions of mature height asparagus sprouts S which are in the path T of the head 14. The forward ends 23 of each leg 20 forwardly converge to an apex 21.

The surfaces 24 will laterally inwardly guide the upper portion of a mature stalk S from a position schematically illustrated at 51, in the path of the divider legs 20 to a laterally inner position schematically illustrated at 53.

The head 14 thus functions as a height sensing unit which will permit stalks 12 which are shorter than the predetermined height to pass below the rearwardly converging guide surfaces 24 to the position illustrated at 12a in FIG. 4 while guiding the upper portions of mature stalks S to be received in the channel 22 as schematically illustrated at 51, 53 and 55 (FIG. 3).

Mounted atop the mounting block 18 is a double acting, solenoid actuated, spring returned pneumatic or hydraulic cylinder, generally designated 26, having a piston rod 28 slidably received in an opening 29 provided in the block 18. The piston rod 28 is coupled to a slide 30 which is vertically reciprocally slidably mounted on the ways or guide rods 16.

Fixed to the underside of the slide 28 is a coil spring 32 which is freely, reciprocally received in a vertical passage 33 provided in the head 14 and a vertically disposed hollow guide sleeve 35 mounted thereon.

A guide foot, generally designated 34, is mounted on the lower end 36 of the spring 32 and comprises a generally U shaped plate 38 having a pair of spaced apart guide legs 40. The legs 40 are spaced apart by a forwardly opening gap or channel, generally designated 42, which is generally vertically aligned with the gap 22 provided in the height sensing divider head 14. The guide legs 40 include rearwardly converging guide surfaces 44 terminating in a rearward guide channel 46. As the harvester 9 moves forwardly, in the direction represented by the arrow T, the guide surfaces 44 will laterally inwardly move the upper portions of mature asparagus spear S from the position in the path of the guide surfaces 44, illustrated at 51, to a laterally inward position illustrated at 53 and thence to the guide channel, in the position illustrated at 55.

It should be noted that the horizontal breadth or width W of the guide legs 40 is substantially less than the breadth or width W1 of the divider legs 20 to minimize distrubance of the immature stalks as will become more readily apparent hereinafter. It should also be noted that the forward ends 47 of guide legs 40 trail the forward ends 21 of the divider legs 20.

Sensing apparatus, generally designated 48, is provided for sensing the thickness or breath B of the spears S which are of the predetermined height and includes a pair of relatively stiff, spring steel sensor wires 50 mounted on head 14 and overlie the guide foot channel 46. A mature spear S being received in the guide foot channel 46 will actuate the sensor wires 50 to actuate a microswitch 52 mounted on the legs 20 of head 14. The laterally inner terminal ends 50a of the spring wires 50 are spaced apart by a gap 54 which is slightly less than the predetermined breath B of the stalk S to be cut. The spring steel sensing wires 50 are sufficiently stiff so as not to yield to a stalk or spear S which is of predetermined height but is less than predetermined breath. If the spear is of less than predetermined breadth, the sensor wires 50 will merely direct it inwardly into the gap 54 where it will merely pass through the gap 54 and thence beneath the forwardly traveling frame F without actuating microswitch 52. In this way, stalks S having less than a predetermined breadth will not sufficiently flex the sensing wires 50 to actuate microswitch 52.

If desired, the sensing unit 48 could likewise comprise other sensing mechanisms, such as two front-to-rear spaced apart photocells (not shown) and two oppositely disposed photo receptors (not shown). The photocells and receptors would be spaced such that if both of the photo receptors were not receiving light, then a signal would be sent to operate the cylinder 26. Likewisely, the sensing unit 48 could be replaced by a capacitance operated switch.

When the microswitch 52 is actuated, the cylinder 26 will be operated to lower the piston rod 28, slide 30, the spring 32 and the guide foot 34 from the raised inoperative position, illustrated in solid lines in FIGS. 1 and 2, to the lowered position illustrated in chain lines in FIGS. 1 and 2.

Figure 4:
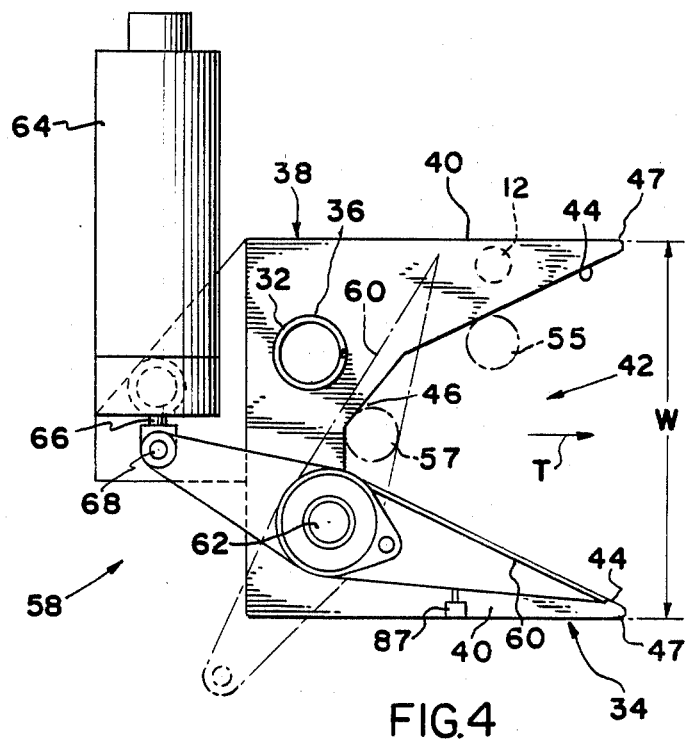
FIG. 4 is an enlarged top plan view of the guide foot and spear severing mechanism, taken along the line 4—4 of FIG. 2.

When a stalk or spear S of sufficient width and height is sensed and received at the position illustrated at 55 in FIG. 4, the cylinder 26 will be operated to extend the piston rod 28 and move the flexible, resilient spring 32 and guide foot 34 downwardly from the inoperative position, illustrated in solid lines in FIGS. 1 and 2, to the lowered positions, illustrated in chain lines in FIGS. 1 and 2. The mature spear or stalk S is retained in the guide channel 46 between the guide legs 40 and horizontally guides the lower end of flexible spring 32 as the guide foot 34 is downwardly moved along the length of the spear. The guide legs 40 and guide channel 46 will thus sense the contour of the spear and will follow the contour of the stalk. If the stalk or spear is bent or curved, as illustrated at 56, the foot 34, the guide legs 40 and the lower end of spring 32 will be directed and guided horizontally therealong in any horizontal direction as it moves the length of the stalk.

The foot mounting coil spring 32 is selected of materials such that the section modulus and/or stiffness of spring 32 is less than the section modulus and/or stiffness, respectively, of a mature breadth asparagus spear S so that the lower portion 36 of the spring 32 will flex, displace or be moved horizontally. The spring 32, and not the asparagus spear S, will horizontally yield so that the spear S will not be bent and broken. This permits the foot member 34 to follow and guide on the asparagus stalk to its base at ground level G without breaking the mature height and breadth spear S.

Mounted on the foot member 34 is severing mechanism, generally designated 58, including a cutter blade 60 pivotally mounted on a spindle or shaft 62 fixed to the guide foot 40. As the guide foot is moved horizontally, the cutter blade 60 is concurrently moved therewith. The guide foot member trails the height sensing head 14 and receives the spears of predetermined height therefrom.

A double acting, pneumatically or hydraulically controlled, solenoid actuated, spring returned cylinder 64 is mounted on the foot 34 and includes a piston rod 66 pivotally connected, via pin 68, to the cutter knife 60 for swingably moving the cutter knife 60 from the non-severing position, illustrated in the solid lines in FIG. 4, to the spear severing position, illustrated in chain lines in FIG. 4, to cut the spear S. The inner surface 45 of foot 34 includes an opposing sharpened surface which cooperates with blade 60 to sever the spear S.

A ground actuated, pressure sensing switch 70 is provided on the underside of the foot 34 for actuating the blade actuating cylinder 64 when the foot is in the lowered, ground engaging position, illustrated in chain lines in FIGS. 1 and 2. The stroke of piston rod 28 is such that it will not be at the full length of its travel when the foot 34 engages the ground G.

Apparatus is provided for realigning the foot 34 with the head 14, upon return of the foot 34 to the raised inoperative position (illustrated in solid lines in FIGS. 1 and 2), and includes a plate 72, depending from the head 14, having a V-shaped downwardly opening V-shaped notch surface 74 for receiving a guide pin 76 projecting rearwardly from the foot 34. On the return path of foot 34 the cooperating guide pin 76 and guide block 72 reorients the foot 34 to the same position to receive the next asparagus spear to be harvested.

Spear picking or gripping apparatus, generally designated 80, is mounted on the slide 30 for gripping the severed spear and includes a pair of spear gripping jaws 82 swingably mounted provided on the block 30 via a pivot pin 84. A double acting, solenoid actuated, spring returned, pneumatically or hydraulically controlled cylinder 86 is pivotally mounted on one of the jaws 82 and includes a piston rod 88 pivotally coupled to this other jaw 82 for swinging the jaws 82 from the non-gripping positions, illustrated in solid lines in FIG. 1, to the closed spear gripping positions, illustrated in chain lines in FIG. 1, to grasp the upper portion of the severed spear S.

A limit switch 83 is mounted on the upper stationary mounting block 18 for sensing the presence of the slide 30 in its uppermost position. Mounted on the head 14 is a limit switch 85 which will be actuated when the slide 30 is in its fully downward position. This may occur if the ground "falls away" and the foot 34 does not contact the ground G when the foot is in its lowermost position. A limit switch 87 is also provided on the foot 34 for sensing the release of the cutter knife 60.

A frame supported airjet 89 is provided for blowing the released asparagus stalk into a bin (not shown) when the grippers 82 release the severed, lifted stalk.

THE CONTROL CIRCUIT

Figure 5:
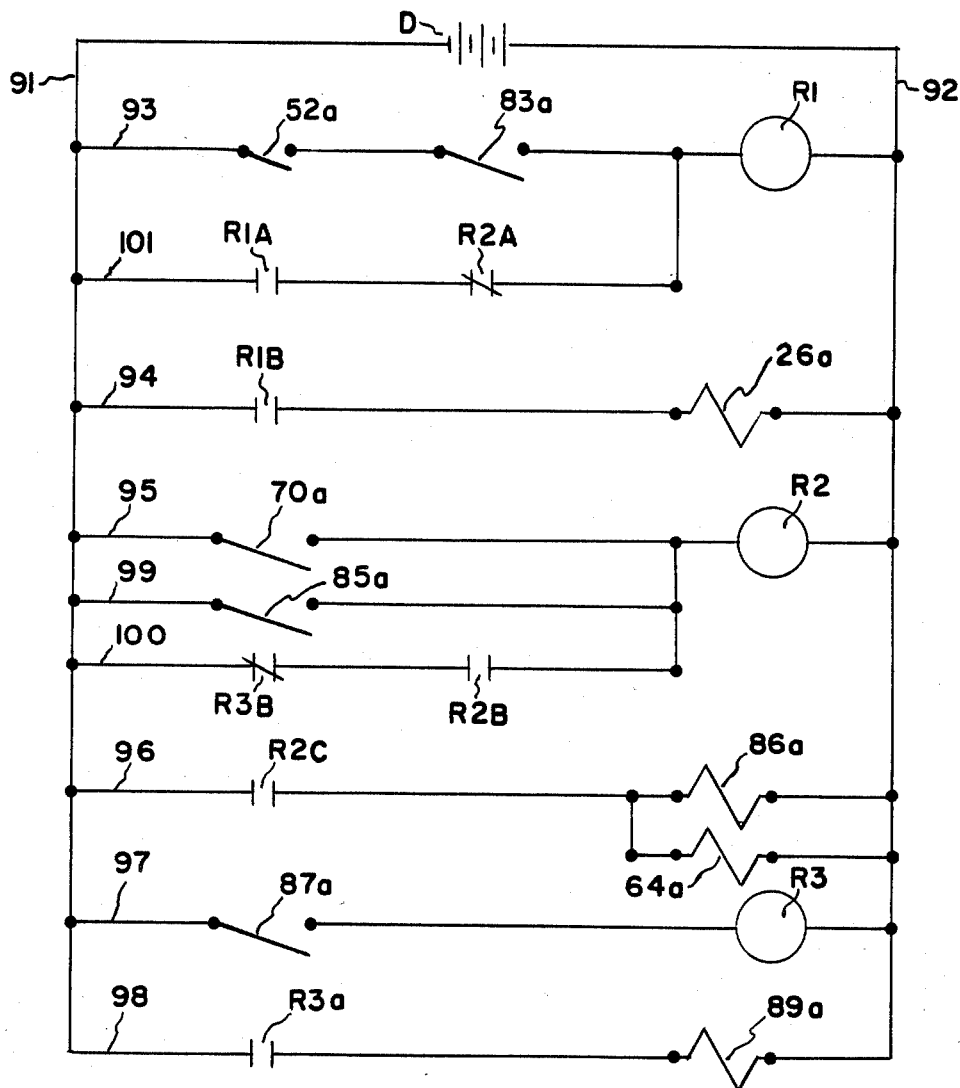
FIG. 5 is a schematic diagram of an electrical control circuit for controlling the apparatus illustrated in FIGS. 1 through 4.

Referring now to FIG. 5, an electrical control circuit for controlling the apparatus illustrated in FIGS. 1-4 is schematically illustrated and includes a pair of lines 90 and 92 coupled to a source of power, such as a 12 volt D.C. battery D, mounted on the tractor.

Coupled across the lines 90 and 92 are a plurality of lines 93, 94, 95, 96, 97 and 98. Serially connected in line 93 is a set of normally open, breadth sensing limit switch contacts 52a which close when the breadth sensing limit switch 52 is actuated by the presence of an asparagus spear S of proper height and width sufficiently flexing the breadth sensing wires 50. Also serially coupled in line 93 is a set normally open limit switch contacts 83a which close when limit switch 83 is actuated by the slide 30 being returned to the uppermost position illustrated in solid lines in FIGS. 1 and 2. Also serially coupled in line 93 is a relay R1 which includes normally open contacts R1A (line 101) and R1B (line 94).

Serially connected in line 94 is the set of normally open limit switch contacts R1B, which close when relay R1 is energized, and a slide cylinder actuating relay 26a, which when energized will operate a valve directing air to the cylinder 26 causing it to downwardly move piston rod 28, the spring 32, and the guide foot 34.

Serially connected in line 95 is a set of normally open limit switch contacts 70a which are closed when the foot mounted switch 70 engages the ground G and a relay R2 having normally closed contacts R2A (line 101), and normally open contacts R2B (line 100) and R2C (line 96). As illustrated in FIG. 5, line 101 which includes the serially connected, normally closed contacts R2A and normally open contacts R1A, is connected in parallel circuit relation with the serially connected, normally open, switch contacts 52a and 83a.

Serially coupled in line 96 are the normally open switch contacts R2C and a gripper actuating solenoid 86a which when energized operates a valve directing air to the gripper actuating cylinder 86 causing the spear gripping jaw members 82 to move from the non-gripping positions illustrated in solid lines in FIG. 1, to the spear gripping positions, illustrated in chain lines in FIG. 1, to sever an asparagus spear S. A blade actuating solenoid 64a is connected in parallel circuit relation with solenoid 86a for directing air to blade actuating cylinder 64.

Serially connected in line 97 is a set of normally open limit switch contacts 87a which close when limit switch 87 is actuated by release of the cutter knife 60 and a relay R3 having normally open contacts R3A which are serially connected in line 98 with an airjet actuating solenoid 89a which operates a valve (not shown) for directing air to the airjet 89.

The two lines 99 and 100 are coupled in parallel relation with switch contacts 70a. Line 99 includes the normally open, lower slide limit switch contacts 85a which are actuated when the limit switch 85 is actuated by the slide 30 reaching its lower limit. Serially connected in line 100 are the normally closed contacts R3B and the normally open contacts R2B.

THE OPERATION

The head 14 is vertically positioned at the desired distance above the ground G such that the underside 14a of divider head 14 is spaced above the ground G a distance equal to the predetermined mature height of the asparagus spears to be harvested. As the mobile frame F moves forwardly, an asparagus stalk 12 which has grown to less than the predetermined height will merely pass below the harvester 10. If a stalk S of predetermined height is received between the terminal ends 21 of the divider legs 14, it will pass to the forwardly opening head channel 22. Those spears which are in alignment with the channel 22 will merely be received thereby whereas the upper portion of the stalk S which are in the path of divider legs 20 will be directed laterally inwardly by divider legs 20 from the position illustrated at 51 to the position illustrated at 53. As the harvester 9 moves forwardly, the converging guide surfaces 44 on the guide legs 40 will receive and further laterally inwardly guide the spears from the position illustrated at 53 to the positions illustrated at 55 and 57. If the stalk has sufficient breath, it will actuate the switch 52 causing the contacts 52a (line 93) to close, thereby energizing relay R1 (line 93) which closes the normally opened contacts R1B (line 94) and actuates the slide cylinder solenoid 26a causing the piston rod 28 to be downwardly extended.

As the slide 30 and spring 32 move downwardly, the asparagus spear S will continue to be received in the position illustrated at 55 and the foot 34 will guide along the outer contour of the stalk S. The guide legs 40 thus follow the contour of the asparagus stem in any horizontal direction as the foot 34 is moved downwardly. The lower end of spring 32 is universally movable in any horizontal direction in response to movement of the guide foot 34 guiding on the asparagus spear S.

As is evident from the drawing, the head 14 might laterally move the upper portion of a selected asparagus spear in one lateral inward direction and as the foot 34 descends and follows the contour of the spear, the foot guide 34 will laterally direct the cutter blade 60 in a laterally opposite direction.

When the foot 34 contacts the ground G, the limit ground sensing switch 70 will be actuated to close the contacts 70a (line 95) to actuate the relay R2 (line 95) which closes the normally opened contacts R2D (line 96) and energizes the spear gripping solenoid 86a, thus actuating the spear gripper cylinder 86 to cause the gripper members 82 to grip the upper portion of the stalk S. The cutter solenoid 64a is simultaneously energized to cause the cutter blade 60 to move from the position illustrated in solid lines in FIG. 4 to the severing position illustrated in chain lines in FIG. 4 to sever the stalk. The cutter blade will temporarily remain in this position to underly the lower end of the severed spear.

If the foot does not reach the ground G to actuate the limit switch 70, the slide 30 will activate the switch 85 thus closing limit switch contacts 85a (line 99) to energize relay R2 and thus cause the gripper solenoid 86a and the cutter blade solenoid 64a to be energized.

As is evident from the drawing, the horizontal breadth W of the foot is substantially less than the horizontal breadth W1 of the height sensing divider head 14. Thus, as the guide foot 34 moves downwardly, it will not disturb as many adjacent immature spears as would otherwise be disturbed if the height sensing head 14 was moved downwardly.

When relay R2 (line 95) is energized, the slide 30, the foot 34 and the severed stalk begin to travel upwardly as slide cylinder 26a "loses its air" as a result of normally contacts R2A (line 101) being opened when relay R2 is energized.

When the slide 30 is near its full up or raised position, illustrated in FIG. 1, the limit switch 87a is actuated by return of the knife blade 60, causing relay R3 (line 97) to be energized to close the contacts R3A (line 98) and thus energize relay 89a directing an upwardly blast of air to blow the raised stalk to a storage bin (not shown) as contacts R3B (line 100) are opened. The V-shaped plate 72 and guide pin 76 will cooperate to reorient the guide foot 34 which would have been disoriented as a result of following the skewed path of the asparagus spear.

When the slide 30 is fully returned, the slide return switch 83a (line 93) again closes and the cycle may be repeated.

ALTERNATE EMBODIMENT

Figure 6:
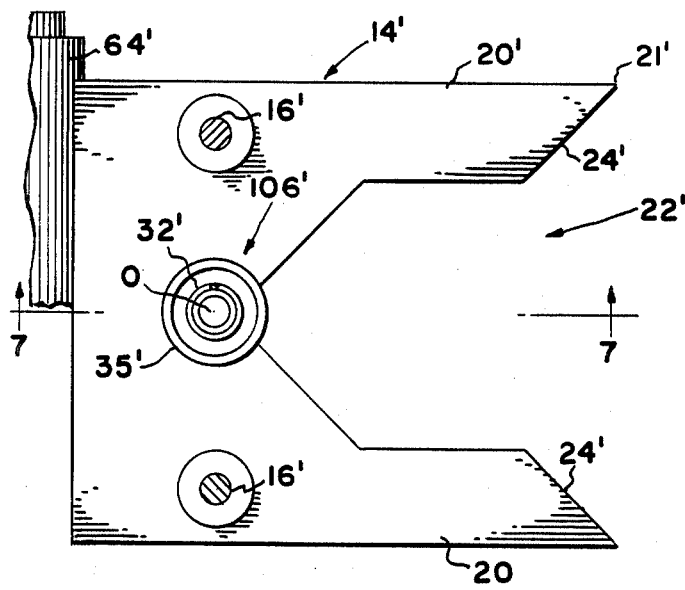
FIG. 6 is top plan view, similar to FIG. 4, illustrating a slightly modified embodiment, taken along the lines 6—6 of FIG. 7.
Figure 7:
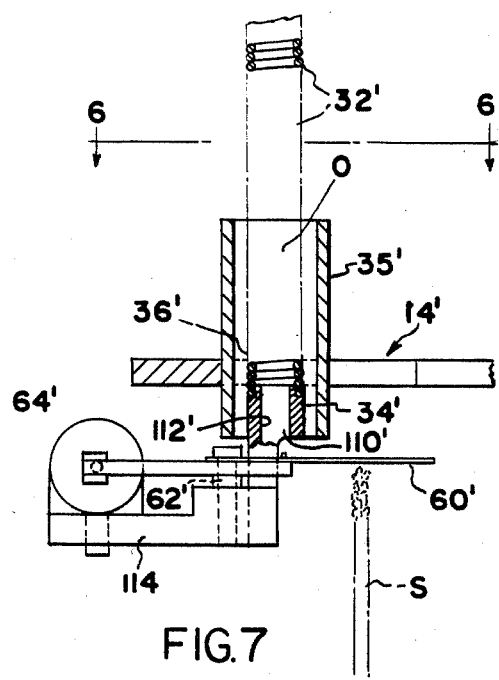
FIG. 7 is a sectional side view, taken along the line 7—7 of FIG. 6.

Referring now more particularly to FIGS. 6 and 7, a slightly modified embodiment is illustrated wherein similar parts will be referred to by similar numerals followed by a prime designation. The harvester 9' primarily distinguishes from the harvester 9 in that the guide foot 34 is replaced by a guide tube 34' fixed to the lower end 36' of the resilient, horizontally flexible spring 32' which is aligned with the apex 106 of rearwardly converging surfaces 108' provided at the rearward ends of legs 20'.

The tube 34' includes a forward wall opening 110' which permits the upper end of the asparagus spear to be received therein and bear against a dependent semi-cylindrical rear wall flange 112' which catches the asparagus stalk and aligns it with the opening O provided in the hollow flexible spring 32'. A support 114 is fixed to the lower dependent rearward wall 112' and mounts a cylinder 64' for actuating a knife blade assembly, generally designated 60', pivotally mounted on the foot 34' via a pivot pin 62'.

In the embodiment illustrated in FIGS. 6 and 7, the severed asparagus stalk S is aligned with the opening in the coil spring 32' and as the foot 34' is lowered, the guide cylinder 34' surrounds or encompasses the stalk S such that the stalk S passes upwardly within the opening O and is retained thereby as the spring 32' is retracted.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Apparatus for harvesting, ground embedded upstanding asparagus spears comprising:
    a mobile frame moveable in a forward path of travel;
    severing means for severing at least one ground embedded asparagus spear having an irregular contour between its upper tip and lower base;
    means mounting said severing means on said frame for vertical movement between a raised inoperative position and a lowered severing position adjacent the ground and the base of said one spear;
    said mounting means including means permitting said severing means to horizontally move in any horizontal direction as said severing means moves downwardly; and
    guide means for horizontally guiding said severing means in a path following the irregular contour of said one spear as said severing means moves between said raised and lowered positions to horizontally displace said severing means and position said severing means adjacent the base of said one spear.

2. The asparagus harvester as set forth in claim 1 wherein said means permitting said severing means to move horizontally comprises yieldable means and means coupled to said yieldable means for bearing against and guiding on said one spear as said severing means moves between said raised and lowered position.

3. The asparagus harvester set forth in claim 1 wherein said yieldable means comprises resilient means and said guide means comprises means mounted on a lower position of said resilient means for horizontally guiding said lower portion of said resilient means.

4. The asparagus harvestor set forth in claim 3 wherein said resilient means comprises a spring.

5. The asparagus harvester set forth in claim 1 including additional guide means for laterally inwardly directing an upper portion of said one spear as said mobile frame moves forwardly.

6. The asparagus harvester set forth in claim 5 wherein said additional guide means comprises opposed guide surfaces which rearwardly converge to an apex, said severing means comprising cutter blade means movable from a non-cutting position to a cutting position to sever a spear received at said apex, and means, responsive to said severing means being in said lowered position, for activating said cutter blade means.

7. The asparagus harvester set forth in claim 1 wherein said means for horizontally guiding said severing means includes opposed rearwardly converging members for laterally inwardly guiding an upper portion of said one spear when said severing means is in said raised inoperative position.

8. The asparagus harvester set forth in claim 7 wherein said severing means is mounted on said guiding means.

9. The asparagus harvester set forth in claim 8 wherein said frame includes a sleeve means and said means permitting said severing means to move horizontally comprises reciprocally movable spring means received by said sleeve means.

10. The asparagus harvester set forth in claim 9 wherein said frame mounts additional guide means for guiding the upper portion of said one spear laterally inwardly as said mobile frame moves forwardly.

11. The asparagus harvester set forth in claim 1 including cooperating aligning means on said frame and said guiding means for directing the return of said severing means to said raised inoperative position.

12. The asparagus harvester set forth in claim 1 wherein said means permitting said severing means to move horizontally comprises spring means;
    said guiding means comprising forwardly projecting guide legs mounted on the lower portion of said spring means;
    said guide legs including rearwardly converging surfaces for laterally inwardly directing an upper portion of said one asparagus spear;
    said frame comprising an opening therethrough slidably receiving said spring means; and
    means is provided for vertically reciprocally moving said spring means to move said severing means between said raised and lowered positions.

13. The asparagus harvester set forth in claim 12 wherein said severing means comprises cutter blade means mounted on said guiding means for pivotal movement between a spear receiving position and a spear cutting position; and means is mounted on said guiding means for moving said cutter blade means between said spear receiving position and said spear cutting position.

14. The harvester set forth in claim 13 further including means for sensing the presence of an asparagus spear of a predetermined height; said means for moving said cutter blade means being operative in response to said sensing means sensing the presence of a spear of predetermined height.

15. The harvester set forth in claim 14 further including second means for sensing the breadth of said one spear; said means for moving said cutter blade means being operative in response to said second sensing means sensing the presence of an asparagus spear having said predetermined breadth.

16. The harvester set forth in claim 15 further including spear grasping means mounted on said frame for vertical movement between a raised, non-grasping position and a lowered, spear grasping position to grasp and upwardly retract a severed spear.

17. The harvester set forth in claim 1 wherein said means permitting said severing means to horizontally move includes spear receiving passage means therein for receiving and upwardly passing a severed spear.

18. The harvester set forth in claim 17 wherein said means permitting said severing means to horizontally move comprises vertically movable elongate resilient means; said severing means being mounted on said resilient means for movement therewith.

19. The harvester set forth in claim 18 wherein said resilient means comprises a generally vertically disposed, horizontally flexible spring.

20. The harvester set forth in claim 17 wherein said guiding means comprises a hollow guide tube mounted on the lower end of said resilient means for receiving and upwardly passing a spear to said passage.

21. The harvester set forth in claim 20 wherein said guide tube includes an annular sidewall having a forwardly disposed opening therein for receiving an upper portion of an asparagus spear to be severed.

22. The harvester set forth in claim 1 wherein said means permitting said severing means to horizontally move comprises generally vertically disposed, horizontally flexible means.

23. The harvester set forth in claim 22 wherein said horizontally flexible means includes a lower portion mounting said guiding means.

24. The harvester set forth in claim 23 wherein said horizontally flexible means comprises resilient means having a passage therethrough; said guiding means being mounted on said resilient means and including guide surfaces for guiding along the side of said one asparagus spear to guide said severing means along said one spear to the base of said one spear.

25. The harvester set forth in claim 24 wherein said guiding means comprises a hollow spear receiving tube having an opening therethrough, aligned with said passage, for receiving and vertically passing said spear as said severing means moves downwardly.

26. The harvester set forth in claim 1 wherein said means permitting said severing means to move horizontally comprises flexible means which will horizontally yield to permit said severing means to horizontally move in any direction and follow the contour of said one asparagus spear.

27. The harvester set forth in claim 26 wherein said flexible member comprises material having a lateral stiffness less than the lateral stiffness of said one asparagus spear so that said guide means can bear against and be horizontally deflected by, but without breaking, said one asparagus spear.

28. The harvester set forth in claim 1 further including first sensing means for sensing the presence of a spear of predetermined height; said sensing means including a generally U-shaped member having a first pair of laterally spaced apart, forwardly projecting legs defining a first channel therebetween for receiving and rearwardly passing the upper portions of an asparagus spears having said predetermined height; said guide means comprising a second, generally U-shaped member having a second pair of forwardly projecting, U-shaped legs spaced apart by a second channel, generally vertically aligned with said first channel, when said severing means is in said raised position for receiving and rearwardly passing an intermediate portion of an asparagus spear having said predetermined height.

29. The harvester set forth in claim 28 wherein the horizontal breadth of said first pair of legs is substantially greater than the horizontal breadth of said second pair of legs.

30. The harvester set forth in claim 29 wherein said second pair of legs include rearwardly converging guide surfaces for laterally inwardly directing the intermediate portion of said asparagus spears of predetermined height.

31. The harvester set forth in claim 30 wherein said second U-shaped member includes a guide channel at the rearward ends of said rearwardly converging surfaces for guiding along the outer surface of said spear as said severing means moves downwardly.

32. The harvester set forth in claim 31 further including means for sensing the breath of said asparagus spears; and means, operative in response to said height sensing means and said breadth sensing means sensing a spear of predetermined height and breath, for vertically moving said severing means.

33. The harvester set forth in claim 1 wherein said means permitting said severing means to move horizontally comprises material having a section stiffness modulus less than the section stiffness modulus of said spear.

34. The harvester set forth in claim 33 further comprising:
   sensing means for sensing the presence of a spear of predetermined height and breadth:
   means operative in responsive to said sensing means sensing the presence of a spear of said predetermined height and breadth for vertically moving said severing means between said raised and lowered positions: and
   means operative in response to said severing means being in said lowered position for actuating said severing means to sever said spear.

35. Apparatus for harvesting ground embedded asparagus spears comprising;
   a frame;
   severing means for severing at least one said asparagus spears;
   means mounting said severing means on said frame for vertical and lateral movement between a raised inoperative position and a lowered spear severing position adjacent the ground and the base of said spear comprising;
   a generally vertically disposed, vertically movable, laterally yieldable member; and
   guide means for guiding said laterally yieldable member and said severing means in a path following the contour of said spear along the length of said spear as said yieldable member is downwardly moved; and
   means for vertically moving said yieldable member to move said severing means between said raised inoperative position and said lowered spear severing position.

36. The apparatus set forth in claim 35 wherein said laterally yieldable member includes an upper portion fixed to said frame and a lower portion horizontally moveable relative to said upper portion and to said frame; said severing means being mounted on said lower portion.

37. Apparatus for harvesting growing asparagus comprising:
   a frame;
   means for sensing an asparagus spear of a predetermined height;
   means for severing said spear;
   means, responsive to said sensing means sensing a spear of predetermined height for moving said severing means between a raised inoperative position and a lowered severing position adjacent the base of said spear comprising;
      laterally yieldable means for guiding said severing means in a path following the contour of the spear along the length of the spear to the base of said spear; and
   means for operating said severing means to sever said spear when said severing means is in said lowered position.

38. An asparagus harvester for selectively harvesting mature asparagus spears of a predetermined height without harvesting immature spears having a lesser predetermined height as the harvester is propelled along the ground comprising;

a mobile frame;

first sensing means on said frame for sensing the presence of an asparagus spear of a predetermined height;

severing means for severing said selected spear of predetermined height;

means mounting said severing means for movement between a raised, inoperative position and a lowered, spear severing position including means permitting said severing means to move a limited distance in any horizontal direction as said severing means moves vertically;

guide means for horizontally guiding said severing means along the outer irregular surface of said spear of predetermined height as said severing means moves downwardly and responsive to horizontal displacement in the contour of said spear to correspondingly horizontally displace said severing means to said lowered spear severing position adjacent the base of said selected spear; and means, responsive to said first sensing means sensing a spear of predetermined height, for vertically moving said severing means between said raised and lowered positions.

39. The harvester set forth in claim 38 further including second sensing means for sensing the breadth of said selected spears; and said vertical movement means being operative in response to said second sensing means sensing a spear of predetermined breath.

40. The harvester set forth in claim 39 wherein said means permitting said severing means to move horizontally includes a mounting member comprising material having a stiffness section modulus less than the stiffness section modulus of the spear to be severed.

41. The harvester set forth in claim 38 wherein said means permitting said severing means to horizontally move comprises horizontally flexible means.

42. The harvester set forth in claim 41 wherein said flexible means comprises generally vertically disposed, hollow spring means.

43. The harvester set forth in claim 41 wherein the section stiffness modulus of said spring means is less than the section stiffness modulus of an asparagus spear.

44. An asparagus harvestor for selectively harvesting mature asparagus spears of a predetermined height without harvesting immature spears having a lesser predetermined height as the harvestor is forwardly propelled along the ground adjacent to a bed of asparagus spears, said harvestor comprising;

a mobile frame movable in a forward path of travel along a bed of asparagus including mature spears and immature spears;

a height sensing, spear divider head mounted on said frame including a pair of forwardly projecting, horizontally spaced apart divider legs disposed at a level above the ground at a distance substantially equal to said predetermined height, said legs defining a first channel therebetween for receiving and rearwardly passing an asparagus spear of predetermined height as said harvestor is forwardly propelled;

a guide foot, disposed at a level below said divider head, including a pair of forwardly projecting guide legs having rearwardly converging guide surfaces defining a guide channel therebetween generally vertically aligned with said first channel for receiving and rearwardly passing said asparagus spears of predetermined height;

spear severing means being mounted on said guide foot;

means for sensing the presence of an asparagus spear of said predetermined height in said first channel;

means, responsive to said sensing means sensing a spear of predetermined height, for moving said guide foot and said severing means between a raised position and a lowered, severing position adjacent the base of said asparagus spear of predetermined height; and mount means, comprising elongate generally vertical, horizontally flexible resilient means, for mounting said guide means on said frame to permit said guide means and said severing means to move horizontally as said guide foot is moved from said raised position to said lowered position.

45. The harvester set forth in claim 44 further including second sensing means for sensing the breadth of said asparagus spears; said moving means being operative in response to said second sensing means sensing the presence of a spear of predetermined breadth.

46. The harvester set forth in claim 45 wherein said divider legs include forward terminal ends spaced apart a predetermined distance; said guide legs including forward terminal ends spaced apart a lesser predetermined distance and positioned rearwardly of the forward terminal ends of said divider legs.

47. The harvester set forth in claim 46 wherein said divider legs include rearwardly converging opposed surfaces for laterally inwardly guiding an upper portion said spear of predetermined height; said guide legs receiving said spear from said divider legs.

* * * * *